United States Patent [19]
Sidwell et al.

[11] 3,727,604
[45] Apr. 17, 1973

[54] EMOTIONAL LEVEL INDICATOR

[76] Inventors: Toney W. Sidwell, 2413 N.W. 113th Place; George F. Reese, 2855 Taft Avenue Southwest, both of Oklahoma City, Okla.

[22] Filed: Oct. 26, 1971

[21] Appl. No.: 192,515

[52] U.S. Cl. .............................................128/2.1 Z
[51] Int. Cl. ............................A61f 5/05, A61b 5/05
[58] Field of Search .................128/2.1 Z, 2 R, 2.1 R

[56] References Cited

UNITED STATES PATENTS

| | | | |
|---|---|---|---|
| 2,535,249 | 12/1950 | Wilhelm et al. | 128/2.1 Z |
| 2,684,670 | 7/1954 | Mathison | 128/2.1 Z |
| 2,734,166 | 2/1956 | Hooker | 128/2.1 Z |
| 2,799,269 | 7/1957 | Mathison | 128/2.1 Z |
| 2,829,638 | 4/1958 | Douglas | 128/2.1 Z |
| 3,085,566 | 4/1963 | Tolles | 128/2.1 Z |
| 3,556,083 | 1/1971 | Grichnik | 128/2.1 Z |
| 3,648,686 | 3/1972 | Payne | 128/2.1 Z |

*Primary Examiner*—Aldrich F. Medbery
*Attorney*—Jerry J. Dunlap et al.

[57] ABSTRACT

An improved emotional level indicator constructed to provide immediate, visual feedback information relative to the changes in an individual's emotional level (changes in the activity of an individual's sympathetic system) which includes an emotional transducer for measuring changes in the individual's emotional level (skin resistance) and providing an output signal responsive to such changes. The output signal of the emotional transducer is amplified and connected to a meter such that the position of the meter is indicative of a particular, relative emotional level, and such that movement of the meter indicator is indicative of whether the individual's emotional level is increasing or decreasing. The amplified output signal of the emotional transducer is further connected to a positive rate transistor amplifier and to a negative rate transistor amplifier, the rate transistor amplifiers being connected such that the positive rate transistor amplifier conducts when the individual's emotional level is increasing, and such that the negative rate transistor amplifier conducts when the individual's emotional level is decreasing. The emotional level indicator further includes a light indicator connected to the positive rate transistor amplifier and a light indicator connected to the negative rate transistor amplifier such that the light indicators provide immediate, visual feedback information indicative of whether the individual's emotional level is increasing or decreasing relative to an initial or predetermined emotional level setting.

12 Claims, 2 Drawing Figures

PATENTED APR 17 1973 3,727,604

INVENTORS
TONEY W. SIDWELL &
GEORGE F. REESE

BY Dunlap, Laney, Hessin & Dougherty
ATTORNEYS

EMOTIONAL LEVEL INDICATOR

BACKGROUND OF THE INVENTION

1. Field of the Invention

This invention relates generally to improvements in bio-feedback apparatus and, more particularly, but not by way of limitation, to an improved emotional level indicator for determining changes in the individual's emotional level and for providing feedback information responsive thereto.

2. Description of the Prior Art

In the past there have been various apparatus constructed to measure or attempt to measure the emotional level of an individual. One such apparatus or technique, which has been successfully utilized, was to apply a small potential to a portion of the individual's skin, and to measure the skin resistance of the individual, the measurement of the skin resistance being indicative of the activity of the individual's emotional level or, in other words, the activity of the individual's sympathetic system.

Most of the apparatus constructed in the past utilizing the last-mentioned technique has been relatively large and complex, and has generally been constructed to graph or plot the change in the individual's skin resistance. This type of apparatus, although useful in some applications, did not provide an immediate feedback indication of the emotional level of the individual, and, thus, did not provide feedback information of a nature which could be successfully utilized by an individual in learning to control the activity of his sympathetic system.

SUMMARY OF THE INVENTION

An object of the invention is to provide an emotional level indicator having an immediate, visual feedback indicative of the change in the individual's emotional level.

Another object of the invention is to provide an emotional level indicator having an immediate, visual feedback indicative of the individual's emotional level as compared to a predetermined emotional level standard.

One other object of the invention is to provide an improved contact element for attachment to a portion of an individual to be utilized in cooperation with apparatus constructed to measure and sense the individual's skin resistance.

Yet another object of the invention is to provide an emotional indicator which is portable and provides immediate bio-feedback information of a nature which can be utilized to aid an individual in learning to control an individual's emotional level.

An additional object of the invention is to provide an emotional level indicator which is economical in construction and operation.

Other objects and advantages of the invention will be evident from the following detailed description when read in conjunction with the accompanying drawings which illustrate the preferred embodiment of the invention.

DESCRIPTION OF THE PREFERRED EMBODIMENT

Figure 1:
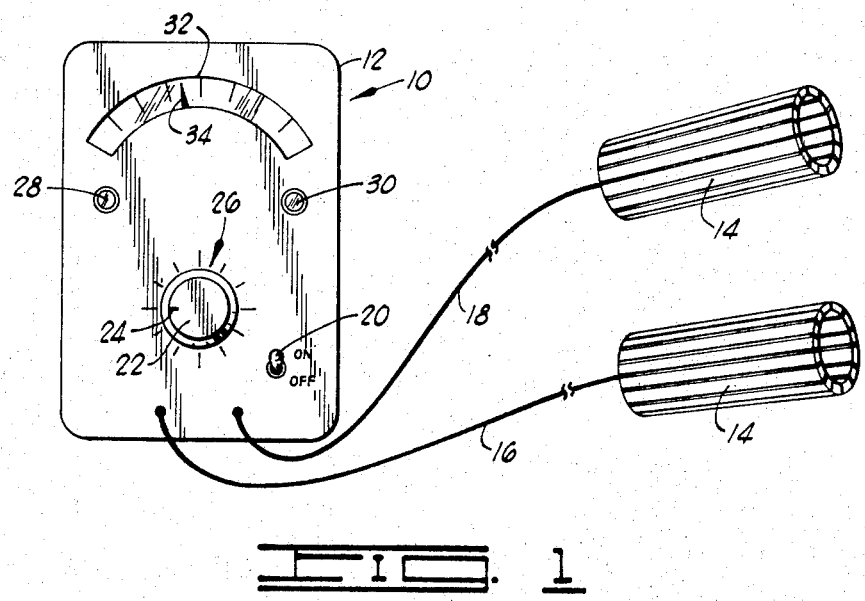
FIG. 1 is a diagrammatical view of an Emotional Level Indicator constructed in accordance with the present invention.

Referring to the drawings in general, and to FIG. 1 in particular, shown therein and designated by the general reference numeral 10 is an emotional level indicator, sometimes referred to below simply as the indicator 10, which basically includes a housing 12 for supporting a substantial portion of the various components and assemblies of the indicator 10, and a pair of contact elements 14, each contact element being connected to the control circuit (to be described in greater detail below) of the indicator 10 via a cable 16 or 18. Generally speaking, the indicator 10 is constructed to sense the change in the emotional level of an individual, and to provide an immediate, visual feedback indicative of the change in the individual's emotional level to enable an individual to learn to control his sympathetic system in a manner useful in such arts as generally referred to as "bio-feedback" response learning techniques and the like, for example.

The indicator 10 includes a toggle switch 20 which is movably secured to the housing 12, and is connected to the control circuit of the indicator 10 to position the control circuit in an actuated and a deactuated status or, in other words, in an "on" and an "off" position, as diagrammatically indicated in FIG. 1. A control knob 22 having a position indicator 24 printed thereon is also movably positioned and supported in a portion of the housing 12, a plurality of gradations 26 being printed on the housing 12, generally about the control knob 22. The gradations 26 are, more particularly, disposed in close proximity or, in other words, in indicating proximity to the control knob 22, each of the gradations 26 being spaced and located to indicate a particular emotional level change or, more particularly, a relative emotional level change, for reasons and in a manner to be described in greater detail below.

A red light indicator 28 and a green light indicator 30 are each supported in the housing 12. The light indicators 28 and 30 are each connected to the control circuit such that the red light indicator 28 is lighted when the individual's change in emotional level has increased with respect to a predetermined emotional level, and the green light indicator 30 is lighted when the individual's change in emotional has decreased with respect to a predetermined emotional level. The indicator 10 and, more particularly, the light indicators 28 and 30 thereof, provide a visual indication of the change in the emotional level of the individual and an indication of the direction of such change, that is whether the individual's emotional level is generally increasing or decreasing in intensity, in a manner and for reasons to be described in greater detail below.

A meter 32 having a plurality of gradations printed thereon is supported in a portion of the housing 12, as shown in FIG. 1. The meter 32 includes a meter needle-type indicator 34 which is positioned in close or indicating proximity to the gradations, and the gradations, in a preferred form, are spaced and positioned to indicate changes in the individual's emotional level. The meter 32 is connected to the control circuit of the indicator 10 such that the movement of the meter indicator 34 thereof is indicative of the change in the individual's emotional level. Thus, the position of the meter indicator 34 with respect to the gradations is indicative of the change in the individual's emotional level and, further, the gradations of the meter 32 provide a standard or a basis which the individual can also utilize to determine changes in the individual's emotional level over a period of time, in a manner to be made more apparent below.

The contact elements 14 are each constructed of a metallic electrically conductive material, and are shaped to be placed into contact with a portion of the individual's body or, more particularly, a portion of the individual's skin. More particularly, each contact element 14 is generally ring-shaped, and is constructed of a plurality of individual pivot elements, each pair of pivot elements being pivotally secured through a central portion thereof, and each end of each pivot element being pivotally secured to one end of one other pivot element of one of the other pairs of pivot elements, in such a manner that the pivot elements combine to provide an expansible type metallic band. Each contact element 14 is constructed to be expanded and then placed over a portion of one of an individual's fingers, each contact element 14 being biased via the various pivot connections to a relaxed or unexpanded position to provide a "snug" fit about the individual's finger.

During the operation of the indicator 10, as will be described in greater detail below, each contact element 14 is fitted snugly about one of the individual's fingers in such a manner that each contact element 14 is in intimate contact with the individual's skin, and yet such that the contact elements 14 are spaced a distance apart or, more particularly, such that there is no contacting engagement between the contact elements 14, per se. The contact elements 14 cooperate with the control circuit to apply a potential across a portion of the individual's skin, and the changes in the individual's skin resistance increases and decreases or, more particularly, changes an input signal to the control circuit of the indicator 10, the changes in the input signal being responsive to changes in the individual's emotional level and being utilized to control the visual output indications of the meter 32, the red light indicator 28 and the green light indicator 30, in a manner briefly mentioned before and which will be described in greater detail below.

It should be particularly noted that skin potential changes occurring in an individual generally are indicative of emotional stimulation of individual's sympathetic system. In general, increased activity of the individual's sympathetic system or, more particularly, an individual's sweat glands lowers the electrical resistance of the skin, and a measure of the change in electrical resistance of the individual's skin is considered to be generally indicative of the emotional level of an individual. The term "emotional level" is used above and below to generally indicate a relative change of an individual's sympathetic system, and is not a measure in any particular, designated units or of any one certain, definite physiological parameter, other than as generally mentioned above with regard to the change in electrical resistance of the individual's skin.

With respect to learning to control one's emotional level, it is important that the individual be provided feedback information which is indicative of immediate changes in his emotional level, and some measurement from which the individual can determine changes in his emotional level relative to a period of time or relative to a preselected, initial emotional level. In this manner the individual is provided with what may be referred to as bio-feedback information which indicates immediate progress, and bio-feedback information which is useful in evaluating one's progress relative to a particular period of time, each of which are considered to be important factors in substantially increasing the individual's learning rate. The indicator 10 is particularly constructed to provide visual bio-feedback information relative to a preselected period of time, in a manner which will be described in greater detail below.

Figure 2:
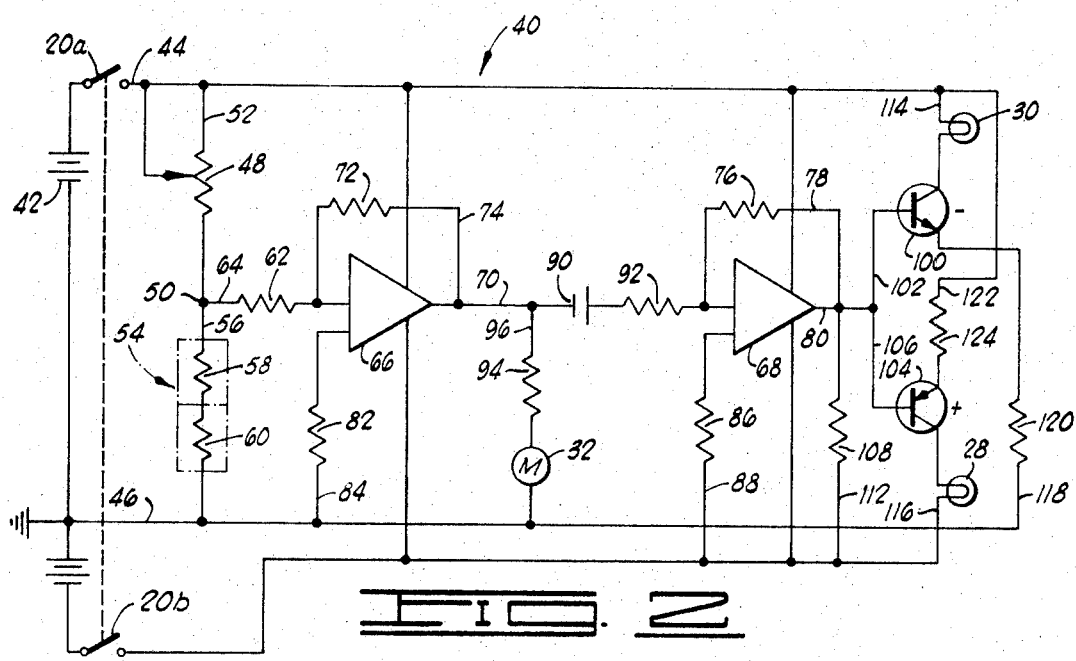
FIG. 2 is a schematic view of the control circuit of the Emotional Level Indicator of FIG. 1.

The control circuit of the indicator 10 is schematically shown in FIG. 2, and generally designated therein by the reference numeral 40. The control circuit 40 includes power supplies 42 and 43 each providing the operating electrical power for the indicator 10; the power supply 42 being connected to some of the various electrical components of the indicator 10 via a pair of conductors 44 and 46; and the power supply 43 being connected to some of the various electrical components of the indicator 10 via conductors 44 and 47. The toggle switch 20 is schematically represented in FIG. 2 by the mechanically connected switches 20A and 20B, the switch 20A being interposed in the conductor 44, and the switch 20B being interposed in the conductor 47. The switches 20A and 20B each have an "on" position and an "off" position, and establish electrical communication between the power supplies 42 and 43 and the remaining components of the control circuit 40 in the "on" or, more particularly, in the closed positions thereof, and interrupt electrical communication between the power supplies 42 and 43 and the remaining components of the control circuit 40 in the "off" or open positions thereof.

A variable resistor 48 is connected to the conductor 44 and to a junction 50 via a conductor 52. More particularly, the variable resistor 48 is operated via the control knob 22, the turning of the control knob 22 raising and lowering the resistance value of the variable resistor 48, in a manner well known in the art. During the operation of the indicator 10, power supply 42 is connected to the individual to apply a relatively small potential to the skin of an individual, thereby causing a relatively small amount of current to flow therethrough and the variable resistor 48 balances the input signal to the control circuit, for reasons and in a manner to be described in greater detail below.

An emotional transducer 54 is connected to the junction 50 and to the conductor 46 via a conductor 56. The emotional transducer 54 is constructed to sense the emotional intensity level of an individual and to provide an output signal responsive thereto. More particularly, the emotional transducer 54 comprises the contact elements 14, each schematically represented in FIG. 2 via the resistors 58 and 60. During the operation of the indicator 10, the contact elements 14 are each in intimate contact with a portion of the individual's skin, as mentioned before, and when a potential is applied to the individual's skin, the current flowing generally between the contact elements 14 via a portion of the skin is indicative of the individual's skin resistance or, in other words, indicative of the sensed emotional level of the individual. The individual's skin portion thus, more particularly, completes the electrical communication between the contact elements 14 or, in other words, the resistors 58 and 60, thereby completing the electrical interconnection between the junction 50 and the conductor 46 via the emotional transducer 54, as schematically shown in FIG. 2.

A resistor 62 is connected to the junction 50, generally between the variable resistor 48 and the emotional transducer 54, via a conductor 64, the resistor 62 also being connected to a first operational amplifier 66 via the conductor 64. The output signal of the first operational amplifier 66 is connected to the input of a second operational amplifier 68 via a conductor 70.

A feedback resistor 72 is connected between the input and the output of the first operational amplifier 66 via a conductor 74, the conductor 74 being, more particularly, connected to the conductor 64, generally between the resistor 62 and the first operational amplifier 66, and to the conductor 70, generally between the first operational amplifier 66 and the second operational amplifier 68. A feedback resistor 76 is connected between the input and the output of the second operational amplifier 68 via a conductor 78, the conductor 78 being, more particularly, connected to the conductor 70 and to a conductor 80, as shown in FIG. 2. A biasing resistor 82 is connected to the first operational amplifier 66 via a conductor 84, and a biasing resistor 86 is connected to the second operational amplifier 68 via a conductor 88.

In an alternate form, the conductor 64 can be connected to the first operational amplifier 66 and the conductor 74 can be connected to the conductor 84, generally between the resistor 82 and the first operational amplifier 66, thereby eliminating the resistor 62. In this embodiment, the resistor 82 would be, more particularly, sized to function as the gain-determining resistor for the first operational amplifier 66.

Each operational amplifier 66 and 68 has one terminal of the input signal source in common with the output terminal, i.e. there is a common ground between the input and the output circuits of the operational amplifiers 66 and 68. The operational amplifiers 66 and 68 are each constructed and operated essentially as direct-current type amplifiers, such amplifiers being well known in the art and a detailed description of the construction and operation thereof being not required herein.

The output signal of the first operational amplifier 66 is electrically coupled to the input of the second operational amplifier 68 via the conductor 70, as mentioned before, and a capacitor 90 and a resistor 92 are interposed in the conductor 70, generally between the connection of the conductor 74 to the conductor 70 and the connection of the conductor 78 to the conductor 70. A resistor 94 is connected to the conductor 70, generally between the connection of the conductor 74 to the conductor 70, and the capacitor 90 via a conductor 96, and the meter 32 is interposed in the conductor 96, as shown schematically in FIG. 2.

The output signal of the second operational amplifier 68 is connected to the base of a negative-rate transistor amplifier 100 via the conductor 80 and a conductor 102, and to the base of a positive-rate transistor amplifier 104 via the conductor 80 and a conductor 106. A base biasing resistor 108 is connected to the conductor 47 and to the conductor 80, generally at the junction of the conductors 78 and 80 via a conductor 112.

The collector of the negative-rate transistor amplifier 100 is connected to the conductor 44 via a conductor 114, and the green light indicator 30 is interposed in the conductor 114. The collector of the positive rate transistor amplifier 104 is connected to the conductor 47 via a conductor 116, and the red light indicator 28 is interposed in the conductor 116.

The emitter of the negative-rate transistor amplifier 100 is connected to the conductor 46 via a conductor 118, and a current limiting resistor 120 is interposed in the conductor 116. The emitter of the positive-rate transistor amplifier 104 is connected to the conductor 44 via a conductor 112, and a current limiting resistor 124 is interposed in the conductor 122.

OPERATION OF THE PREFERRED EMBODIMENT

The emotional level indicator 10, described before, is constructed to provide an immediate, visual indication indicative of the changes in an individual's emotional level, and an immediate, visual indication of the relative level of the individual's emotional level, that is relative to a preset or predetermined emotional level setting or a predetermined standard. Initially the contact elements 14 are expanded, and one contact element 14 is snugly fitted about one of the individual's fingers and the other contact element 14 is snugly fitted about one of the other fingers. The precise placement of the contact elements 14 is not considered to be relatively important; however, it is important to note that the contact elements 14 must be placed such that there is no contacting engagement therebetween, since such contacting engagement would, in essence short the contact elements 14 around the individual's skin and, in this event, the output signal of the emotional transducer 54 would be essentially constant or, at least, not indicative of the changes in the individual's skin resistance.

After the contact elements 14 have been snugly fitted about the individual's fingers, the toggle switch 20 is moved to the closed or "on" position, thereby establishing electrical communication between the power sources 42 and 43 and the various operating components of the control circuit 40. In this position of the toggle switch 20, a relatively small potential is applied across an area of the individual's skin generally between the contact elements 14, thereby causing a relatively small current to flow thereacross, the potential being applied via the contact elements 14 and the power supply 42.

Assuming that the control knob 22 has initially been moved to a particular position to adjustingly balance the resistance value of the variable resistor 48 with the skin resistance, the output signal of the emotional transducer 54 is responsive to the change in the resistance generally between the junction 50 and the conductor 46 or, in other words, the output signal is indicative of the individual's skin resistance (emotional level or relative activity of the individual's sympathetic system). The output signal of the emotional transducer 54 is amplified via the first operational amplifier 66, the amplified output signal of the first operational amplifier 66 being responsive to changes in the individual's emotional level, in this position of the control knob 22.

The output signal of the first operational amplifier 66 is also coupled to the second operational amplifier 68, the second operational amplifier 68 thereby further amplifying the output signal of the emotional transducer 54. The output signal from the first operational amplifier 66 is further coupled to the second operational amplifier 68 via the capacitor 90, the capacitor 90 functioning in the nature of a differentiator to assure that only the changes in the individual's emotional level are transmitted to the second operational amplifier 68 and subsequently amplified thereby, in this mode of operation of the indicator 10.

The negative-rate transistor amplifier 100 and the positive-rate transistor amplifier 104 are each biased by the output signal of the second operational amplifier 68 applied generally across the base biasing resistor 108. Further, the negative-rate transistor amplifier 100 and the positive-rate transistor amplifier 104 are each connected to the base biasing resistor 108 and to the power supply 42 such that the negative-rate transistor amplifier 100 is biased "on" or, in other words, conducts when the output signal of the second operational amplifier 68 indicates a decreased sensed emotional level, thereby indicating a decrease in the activity of the individual's sympathetic system; and such that the positive-rate transistor amplifier 104 is biased "on" or, in other words, conducts when the output signal of the second operational amplifier 68 indicates an increased sensed emotional level, thereby indicating an increase in the activity of the individual's sympathetic system.

The green light indicator 30 is connected to the negative-rate transistor amplifier 100 such that the green light indicator 30 is lighted when the negative-rate transistor amplifier 100 is in the biased "on" position, thereby providing an immediate, visual output indication indicative that the individual's emotional level is changing in a decreasing direction or, more simply, the individual is decreasing the activity of his sympathetic system. By the same token, the red light indicator 28 is connected to the positive-rate transistor amplifier 104 such that the red light indicator 28 is lighted when the positive-rate transistor amplifier 104 is biased in the "on" position, thereby providing an immediate, visual output indication, indicative that the individual's emotional level is changing in an increasing direction or, in other words, the individual is increasing the activity of his sympathetic system.

In one mode of operation of the indicator 10, the variable resistor 48 thus provides an initial setting with which the changes in the individual's emotional level or, more particularly, the changes in the individual's skin resistance are compared or balanced. In a preferred form, the individual will initially adjust the variable resistor 48 by turning the control knob 22 to a position wherein the resistance value of the variable resistor 48 is balanced with the individual's skin resistance, thereby balancing the input to the first operational amplifier 66. In this position, the position indicator 24 of the control knob 22 is in indicating proximity with a particular gradation mark indicating an initial or relative emotional level of the individual. The balanced position of the variable resistor 48 is determined visually by adjustingly turning the control knob 22 to a position generally between a position wherein the red indicator light 28 is lighted, and a position thereof wherein the green indicator light 30 is lighted. In other words, the control knob 22 is adjustingly turned to a position wherein the individual's skin resistance is neither changing in the positive direction (increasing) nor changing in the negative direction (decreasing).

The individual can subsequently adjust the initial emotional level setting of the indicator 10 according to his own particular needs or desires to raise and lower the initial or predetermined emotional level setting, thereby working toward reducing or increasing his emotional level over a period of time or relative to various preset, predetermined emotional level settings. In any event, the position of the indicator portion 24 of the control knob 22 relative to the gradations 26 is indicative of various emotional level settings, such indication being useful in determining net gains and losses in the increasing or the decreasing of the individual's emotional level. In one other mode of operation, the control knob 22 is positioned to a particular emotional level setting above or below the individual's immediate emotional level, as determined by adjusting the variable resistor 48 via the control knob 22 to a position generally between a position wherein the red light indicator 28 is lighted and a position wherein the green light indicator 30 is lighted, as described before, and the individual can then attempt to raise or lower his emotional level setting, the lighting of the red light indicator 28 or the green light indicator 30 providing immediate, visual feedback information informing the individual of his success or failure.

The output signal of the first operational amplifier 66 which is also indicative of the individual's emotional level or, more particularly, the output signal is responsive to the output signal of the emotional transducer 54. The output signal of the first operational amplifier 66 is applied across the resistor 94 and the meter 32 such that the operation of the meter 32 and, more particularly, the movement of the meter indicator 34 and the position of the meter indicator 34 with respect to the gradations printed thereon is indicative of the sensed emotional level of the individual. More particularly, the position of the meter indicator 34 is indicative of a relative emotional level of an individual, the movement of the meter indicator 34 is indicative of the individual's change in emotional level, and the direction of the movement of the meter indicator 34 is indicative of a decreasing and an increasing emotional level. As the individual's emotional level increases, the meter indicator 34 will be moved in one direction an amount indicative of the change in the individual's emotional level, the direction of the movement of the meter indicator 34, relative to an initial position, thereby indicating that the individual's emotional level is increasing. By the same token, as the individual's emotional level decreases, the meter indicator 34 will be moved in a direction, generally opposite with respect to the movement thereof resulting from an increasing emotional level, thereby indicating that the individual's emotional level is decreasing, the amount or degree of movement of the meter indicator 34 again being indicative of the change in the individual's emotional level.

The initial position of the meter indicator 34 with respect to the gradations on the meter 32 is indicative of a preset or predetermined emotional level setting. The gradations of the meter 32 and the gradations 26 each provide relative emotional level indications which can be utilized to evaluate experiences.

The indicator 10 thus provides an economical, portable apparatus capable of measuring the relative emotional level of an individual and providing immediate, visual bio-feedback information indicative of the change in the activity of the individual's sympathetic system, and also provides immediate, visual bio-feedback information indicative of the individual's emotional level relative to an initial or predetermined emotional level setting. The indicator 10 is thus particularly useful, for example, in teaching individuals the art of controlling their sympathetic system or emotional level, since the indicator 10 provides immediate, visual feedback indicating the individual's success or failure, a type of feedback which is considered to be extremely important, if not essential, in this type of learning process.

Changes may be made in the construction and the operation of the various parts and the elements described herein without departing from the spirit and the scope of the invention as defined in the following claims.

What is claimed is:

1. An emotional level indicator for providing feedback indications of an individual's emotional level, comprising:
   emotional transducer means for sensing the emotional level of an individual and providing an output signal responsive to the sensed emotional level;
   negative-rate amplifier means biased by the output signal responsive to the sensed emotional level, an output signal indicating a decreased sensed emotional level biasing the negative-rate amplifier means "on";
   a light indicator means connected to the negative-rate amplifier means and being lighted in the biased "on" position of the negative-rate amplifier means, thereby providing an immediate, visual indication of a decreased emotional level;
   positive-rate amplifier means biased by the output signal responsive to the sensed emotional level, an output signal indicating an increased sensed emotional level biasing the positive-rate amplifier means "on"; and
   a light indicator means connected to the positive-rate amplifier means and being lighted in the biased "on" position of the positive-rate amplifier means, thereby providing an immediate, visual indication of an increased emotional level.

2. The indicator of claim 1 wherein the emotional transducer means is defined further to include:
   a pair of contact element means for contacting a portion of the individual; and
   means connected to the pair of contact elements for applying a relatively small potential to a portion of the individual via the pair of contact element means, the output signal of the emotional transducer means being indicative of the individual's skin resistance.

3. The indicator of claim 2 wherein the emotional transducer means provides an output signal indicative of the change in the individual's skin resistance.

4. The indicator of claim 2 defined further to include:
   a variable resistor means connected to the contact element means to balance the output signal of the emotional transducer means, the output signal of the emotional transducer means being indicative of decreasing and increasing changes in the emotional level of the individual.

5. The indicator of claim 2 wherein each contact element means is defined further to include:
   an expansible band constructed of a metallic material for snugly fitting about a portion of one of the individual's fingers.

6. The indicator of claim 1 defined further to include:
   a meter means having a meter indicator connected to the emotional transducer means for receiving the output signal of the emotional transducer means, the position of the meter indicator being indicative of the relative emotional level of the individual, the movement of the meter indicator indicative of the individual's change in emotional level, the direction of movement of the meter indicator indicative of a decreasing and an increasing emotional level.

7. The indicator of claim 1 defined further to include: a power supply means; and wherein the negative-rate amplifier means and the positive-rate amplifier means are each transistor type amplifiers, the collector of the positive-rate amplifier means connected to the negative side of the power supply means and the second-mentioned light indicator means interposed between the positive-rate amplifier means and the power supply means, the emitter of the negative-rate amplifier means connected to the positive side of the power supply means and the first-mentioned light indicator means interposed between the negative-rate amplifier means and the power supply means.

8. The indicator of claim 1 defined further to include:
   first operational amplifier means interposed generally between the emotional transducer means and the negative-rate amplifier means and the positive-rate amplifier means for amplifying the output signal of the emotional transducer means.

9. The indicator of claim 8 defined further to include:
   a second operational amplifier means connected to the first operational amplifier means for receiving the amplified output signal of the first operational amplifier means and further amplifying such signal.

10. The emotional level indicator of claim 1 defined further to include:
    a pair of contact elements, each contact element being an expansible band constructed of a metallic material for snugly fitting about a portion of one of the individual's fingers;

means connected to the pair of contact elements for applying a relatively small potential to a portion of the individual via the pair of contact elements; and means connected to the pair of contact elements for sensing the changes in the individual's skin resistance and providing an output indication responsive thereto.

11. A method for providing feedback indications of an individual's emotional level, comprising:

sensing the emotional level of an individual and providing an output signal responsive to the sensed emotional level;

amplifying the output signal responsive to the sensed emotional level and providing an amplified output signal responsive thereto; and receiving the amplified output signal and directing it to move a meter indicator responsive to the received amplified output signal, observing the movement of the meter indicator to indicate the individual's change in emotional level, the direction of movement of the meter indicator indicating of a decreasing emotional level in one direction and indicating an increasing emotional level in one other direction.

12. An emotional level indicator for providing feedback indications of an individual's emotional level, comprising:

emotional transducer means for sensing the emotional level of an individual and providing an output signal responsive to the sensed emotional level;

negative-rate amplifier means connected to the emotional transducer means and biased by the output signal responsive to the sensed emotional level, an output signal indicating a decreased sensed emotional level biasing the negative-rate amplifier means "on";

positive-rate amplifier means connected to the emotional transducer means and biased by the output signal responsive to the sensed emotional level, an output signal indicating an increased sensed emotional level biasing the positive-rate amplifier means "on"; and indicator means connected to the positive-rate amplifier means and to the negative-rate amplifier means providing an output indication indicative of a decreased emotional level and an output indication indicative of an increased emotional level.

* * * * *